United States Patent [19]
Scott

[11] Patent Number: 5,842,446
[45] Date of Patent: Dec. 1, 1998

[54] NON-IRRITATING, TANGLE FREE ANIMAL COLLAR

[76] Inventor: Thomas Lee Scott, 506 Pinon Dr., Morro Bay, Calif. 93442

[21] Appl. No.: 811,831

[22] Filed: Mar. 5, 1997

[51] Int. Cl.⁶ .................................................... A01K 27/00
[52] U.S. Cl. .............................................................. 119/856
[58] Field of Search ..................... 119/792, 856, 119/858, 863

[56] References Cited

U.S. PATENT DOCUMENTS 765,823   7/1904   Erb, Jr. ..................................... 119/856

FOREIGN PATENT DOCUMENTS 2201874   9/1988   United Kingdom ................... 119/792
2258380   2/1993   United Kingdom ................... 119/792

*Primary Examiner*—Thomas Price
*Attorney, Agent, or Firm*—Marvin E. Jacobs

[57] ABSTRACT

This invention relates to an animal collar that is non-irritating and tangle resistant. The collar comprises a flexible collar portion, a lower collar portion, a device for connecting together the ends of the flexible collar portion, and a device for attaching a leash to the flexible collar portion. The permanent shape of the lower collar portion maintains an open configuration to the collar such that forces on the animal's neck are distributed around the neck thus reducing irritation to the animal.

15 Claims, 2 Drawing Sheets

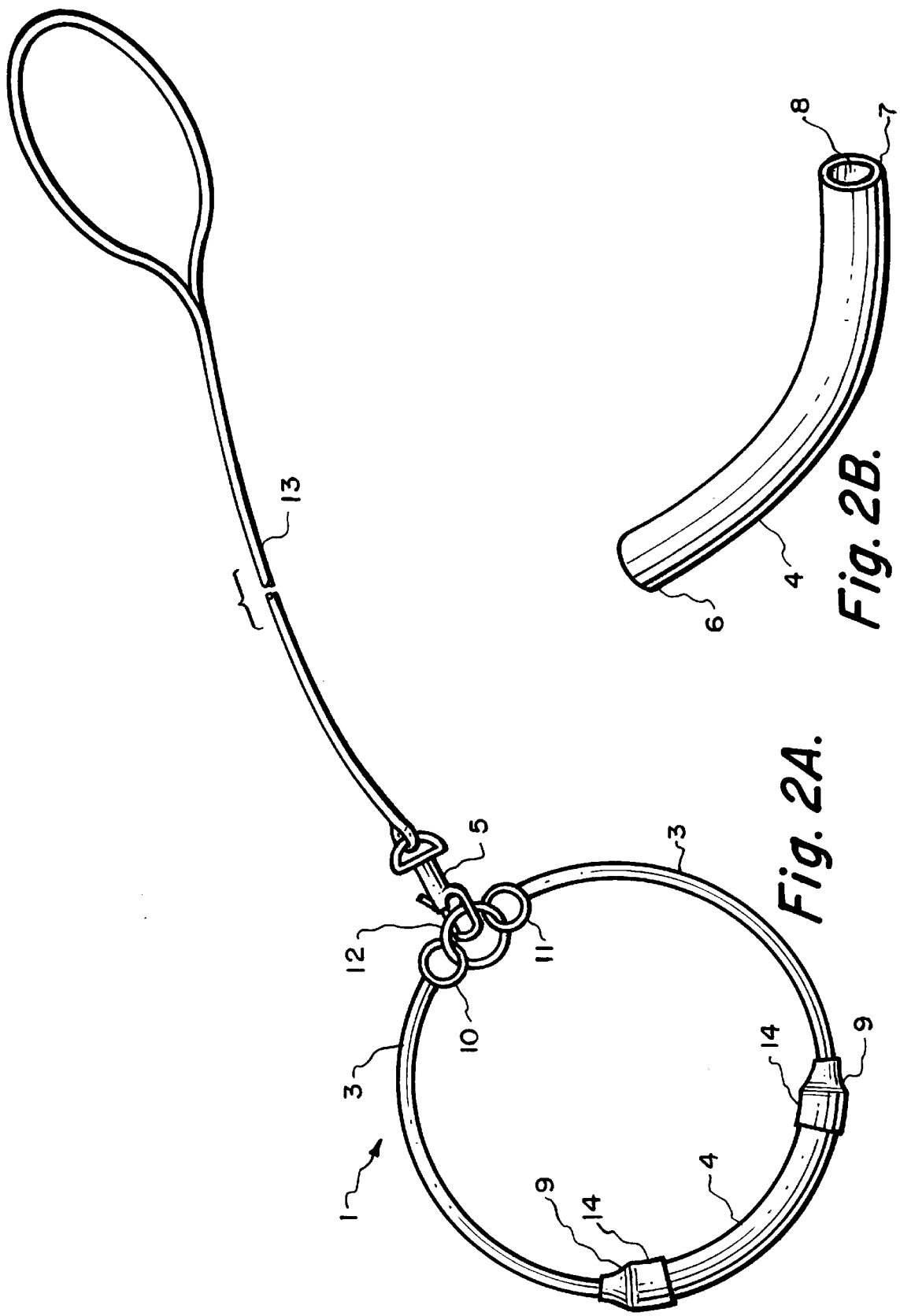

NON-IRRITATING, TANGLE FREE ANIMAL COLLAR

TECHNICAL FIELD

The present invention relates to animal collars and more specifically to animal collars having a smooth, lower portion for reducing entanglement of the animal's fur and for reducing entanglement of the collar's leash with the animal's feet.

BACKGROUND OF THE INVENTION

Entanglement of an animal collar with the animal's fur, discomfort to the animal from improperly designed collars and entanglement of the leash with the animal's feet, particularly when the animal is "off lead", continue to be problems with available collars. Available collars have no shape control thus when tension is applied to the leash, these collars tend to exert compressive forces on the bottom and both sides of an animal's neck. This causes pain and discomfort to the animal and entanglement of the animal's fur. When the animal is "on lead", tension in the leash keeps the leash away from the animal's feet. Without tension in the leash, the attachment point of available leashes is free to slide to a position underneath the animal's neck which then leads to entanglement of the leash with the animal's feet.

List of Prior Art

| Patent No. | Patentee |
|---|---|
| 447,706 | Schneider |
| 649,026 | Wood |
| 2,798,458 | Odermatt |
| 3,701,339 | Kemmerling |
| 3,817,218 | Bongiovanni |
| 4,020,795 | Marks |
| 4,398,500 | Koronkiewicz |
| 4,496,948 | Klein and Klein |
| 5,197,413 | Gyr |

STATEMENT OF THE PRIOR ART

Gyr (U.S. Pat. No. 5,197,413) discloses "a focus of weight", a "counterbalance", that is placed approximately 180 degrees from the leash attachment site. Klein et. al. (U.S. Pat. No. 4,496,948) disclose a flexible collar, for example chain links, wherein an "inter-mediate collar section is made of heavier material. The extra weight of the heavier portion of the collar causes the attachment point to remain at the back of the animal's neck.

Bongiovanni (U.S. Pat. No. 3,817,218) discloses a choke collar the chain of which is covered by a tube of tough plastic or plastic-like material. Marks (U.S. Pat. No. 4,020,795) discloses a "snag proof" stranded wire collar that is fully enclosed in a plastic tube. Similarly, Wood (U.S. Pat. No. 649,026) discloses a metal chain which is encased in a tube of "rubber or other soft, pliable and elastic material".

None of these inventions includes a lower, shaped portion to minimize the compressive forces on the animal's neck caused by tension on the leash.

BRIEF SUMMARY OF THE INVENTION

The animal collar of this invention is a non-irritating, tangle resistant design comprising a flexible collar portion, a lower collar portion, a means for connecting together the ends of the flexible collar portion, and a means for attaching a leash to the flexible collar portion. The shape of the lower collar portion maintains an open configuration to the collar such that forces on the animal's neck are distributed around the neck thus reducing irritation to the animal. This shaping of the animal collar also reduces entanglement of the collar with the animal's fur. The added weight to the collar from the lower collar portion causes the leash attachment point to remain at the top of the animal's neck. This reduces entanglement of the leash with the animal's feet.

These and many other features and attendant advantages of the invention will become apparent as the invention becomes better understood by reference to the following detailed description when considered in conjunction with the accompanying drawings.

BRIEF DESCRIPTION OF THE DRAWINGS

FIGS. 2A and 2B show the details of the animal collar.

DETAILED DESCRIPTION OF THE INVENTION

Figure 1:
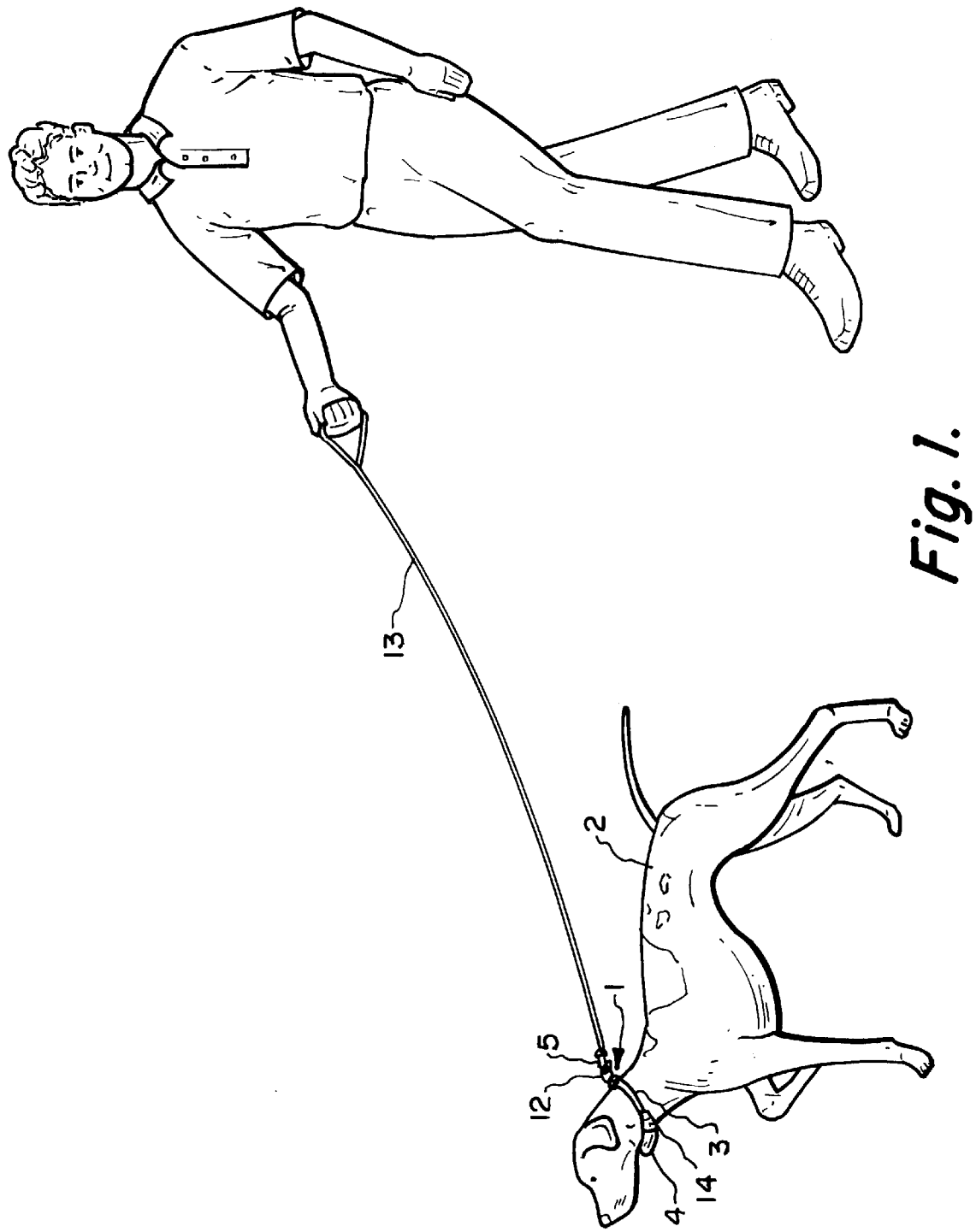
FIG. 1 shows the animal collar in use on a dog.

This invention, a non-irritating, tangle free animal collar is suitable for use on a wide variety of animals, large and small. FIG. 1 shows the animal collar 1 in its preferred embodiment in use, for example, with a dog 2. This invention comprises a flexible collar portion 3 having first and second ends 10, 11 and a lower collar portion 4 connected to flexible collar portion 3. FIG. 2A illustrates a means for connecting 12 first end 10 of flexible collar portion 3 to second end 11 flexible collar portion 3 and a means for attaching 5 a leash 13. FIG. 2B separately shows lower collar portion 4 having first and second ends 6, 7 and an hollow central bore 8 thus forming a tube. In this preferred embodiment, lower collar portion 4 is in the shape of a curvilinear crescent tube generally conforming to the shape of the underside of an animal's neck. Lower collar portion is suitably made of a thermoplastic resin such as PVC pipe which can be shaped and will retain its shape. Lower collar portion 4, by adding weight to flexible collar portion 3, maintains the means for attaching 5 leash 13 at the top of the animal's neck.

Continuing reference to FIGS. 2A and 2B, during fabrication of animal collar 1, flexible collar portion 3 is inserted into central bore 8 of lower collar portion 4 until its ends 10, 11 are approximately equidistant from ends 6, 7, of lower collar portion 4. This places lower collar portion 4 midway between ends 10, 11 of flexible collar portion 3. A means for fairing 9 the transition area 14 between the first and second ends 6, 7 of lower collar portion 4 and flexible collar portion 3 is then applied over the transition area 14. This produces a smooth transition area 14 of the collar 1 that is non-entangling with the fur of the animal.

Flexible collar portion 3 is preferably fabricated from a flexible, durable and strong material having a smooth exterior surface that reduces entanglement of the animal's fur with the collar. In the preferred embodiment, a synthetic plastic resin material is used for this purpose. However, natural materials such as leather may be substituted.

Lower collar portion 4 preferably is fabricated from a rigid synthetic plastic resin. It is also acceptable that lower collar portion 4 be only sufficiently rigid such that the collar 1 is maintained in an open configuration such that forces on the animal's neck are distributed around the neck thus reducing irritation to the animal.

Means for fairing 9 preferably comprises a thin synthetic plastic resin tube snugly fit over both lower collar portion 4 and flexible collar portion 3. Alternatively, a shrink to fit material is also acceptable.

The additional weight added to flexible collar portion 3 by lower collar portion 4 and means for fairing 9 are typically sufficient to maintain the preferred orientation of the collar 1 on animal 2. However, it is acceptable to increase the weight of lower collar portion 4 by fabricating it from materials having higher densities, or to use more material by increasing its wall thickness.

This invention is used exactly as are other animal collars. The first and second ends 10, 11 of flexible collar portion 3 are fastened together around an animal's neck by any conventional means (buckle, snap, split rings, and so forth). A leash 13 is also attached at this same connection point. With the animal "on lead". with tension in the leash 13, the lower collar portion 4 maintains an open shape to collar 1 reducing irritation to the animal. The smooth surfaces of the materials used reduce entanglement of the animal's fur. When the animal is "off-lead", the lower collar portion 4, by virtue of its added weight, maintains the attachment point of the leash at the top of the animal's neck thus minimizing the opportunity for the leash to entangle with the animal's feet.

When the animal is moving forward, the lower portion of the lower collar portion such as the "V" in the PVC pipe swivels to the bottom of the animal's neck, keeping the pressure on the left and right side of the animal's neck, but not on the bottom of the neck preventing choking the animal.

Once the new plastic collar is in place and after a few day of fitting correctly the excess tubing can be cut to make it conform to your animal. There is now no need for the old leather collar to remain.

An "O" ring can be provided, not at the bottom, but one quarter up on the collar of the invention. The animal's ID etc. can be attached here. This helps the collar swivel freely and keeps the tags clean. The collar of the invention can be cleaned in hot or even boiling water, making it a very clean piece of equipment.

It is to be realized that only preferred embodiments of this invention have been described, and that numerous substitutions, modifications, alterations, and applications are permissible without departing from the spirit and scope of the invention as defined in the following claims.

What is claimed is:

1. A non-irritating, tangle free animal collar, comprising:
   a flexible collar portion having first and second ends;
   a lower collar portion having first and second ends and a central bore for coaxially receiving the ends of said flexible collar portion for connection of said flexible and lower collar portions whereby said collar is maintained in a configuration and orientation to minimize discomfort to the animal and to reduce entanglement of the leash with the animal's feet;
   means for connecting the first and second ends of said flexible collar portion; and
   means for attaching a leash to said flexible collar portion.

2. A non-irritating, tangle free animal collar according to claim 1, wherein said flexible collar portion is fabricated from a flexible and durable material having a smooth exterior surface whereby said animal's fur will not become entangled.

3. A non-irritating, tangle free animal collar according to claim 1, wherein said lower collar portion is formed into a permanent curvilinear configuration generally and smoothly conforming to the shape of the underside of an animal's neck.

4. A non-irritating, tangle free animal collar according to claim 3, wherein said lower collar portion is heavier than said flexible collar portion whereby said means for attaching a leash is maintained on top of an animal's neck to reduce entanglement of the leash with the feet of the animal.

5. A non-irritating, tangle free animal collar according to claim 1, further comprising a means for fairing the first and second ends of said lower collar portion whereby a smooth transition of said lower collar portion to said flexible collar portion is provided.

6. A non-irritating, tangle free animal collar according to claim 5 wherein said means for fairing comprises a synthetic plastic resin tube snugly fit over both said lower collar portion and said flexible collar portion at the locations where said flexible collar portion enters and exits said lower collar portion.

7. A non-irritating, tangle free animal collar according to claim 5 wherein said means for fairing comprises a shrink to fit material.

8. A non-irritating, tangle free animal collar according to claim 5, wherein said lower collar portion is fabricated from a rigid synthetic plastic resin.

9. A non-irritating, tangle free animal collar according to claim 1, wherein said flexible collar portion is fabricated from a flexible and durable synthetic plastic resin material.

10. A method of fabricating a non-irritating, tangle free animal collar comprising the steps of:
    forming a flexible collar portion from a flexible and durable material having a smooth exterior surface whereby said animal's fur will not become entangled;
    forming a lower collar portion having first and second ends, a central axial bore, and a predetermined and permanent curvilinear shape;
    passing said flexible collar portion through the central axial bore of said lower collar portion; and
    attaching a leash to said flexible collar portion.

11. A method of fabricating a non-irritating, tangle free animal collar according to claim 8 further comprising the step of fairing the ends of said lower collar portion whereby a smooth transition of said lower collar portion to said flexible collar portion is provided.

12. A method of fabricating a non-irritating, tangle free animal collar according to claim 10 further comprising the step of fairing the ends of said lower collar portion whereby a smooth transition of said lower collar portion to said flexible collar portion is provided.

13. A method of fabricating a non-irritating, tangle free animal collar according to claim 10 wherein said step of forming a lower collar portion includes forming said lower collar portion into a curvilinear configuration generally and smoothly conforming to the shape of the underside of an animal's neck.

14. A method of fabricating a non-irritating, tangle free animal collar according to claim 12 wherein said step of forming a lower collar portion includes forming said lower collar portion so that it is heavier than said flexible collar portion.

15. A method of fabricating a non-irritating, tangle free animal collar comprising the steps of:

forming a flexible collar portion from a flexible and durable material having a smooth exterior surface whereby said animal's fur will not become entangled;

forming a lower collar portion heavier than said flexible collar portion, said lower collar portion having first and second ends, a central axial bore and a predetermined and permanent curvilinear shape generally and smoothly conforming to the shape of the underside of an animal's neck;

passing said flexible collar portion through the central axial bore of said lower collar portion;

fairing the ends of said lower collar portion whereby a smooth transition of said lower collar portion to said flexible collar portion is provided; and attaching a leash to said flexible collar portion.

* * * * *